United States Patent [19]

Maurer et al.

[11] Patent Number: 4,809,557
[45] Date of Patent: Mar. 7, 1989

[54] METHOD AND APPARATUS FOR MEASURING TORQUE

[75] Inventors: Ruprecht Maurer; Karlheinz Timtner, both of Bad Homburg; Frank Reig, Darmstadt-Eberstadt, all of Fed. Rep. of Germany

[73] Assignee: Ringspann Albrecht Maurer KG, Bad Homburg, Fed. Rep. of Germany

[21] Appl. No.: 32,808

[22] Filed: Apr. 1, 1987

[30] Foreign Application Priority Data

Apr. 5, 1986 [DE] Fed. Rep. of Germany ....... 3611509

[51] Int. Cl.[4] .............................................. G01L 3/04
[52] U.S. Cl. .................................................. 73/862.32
[58] Field of Search ....................... 73/862.32, 862.33

[56] References Cited

U.S. PATENT DOCUMENTS

| 682,461 | 9/1901 | Fanning | 73/862.32 |
| 3,823,608 | 7/1974 | Pantermuehl et al. | 73/862.33 |
| 3,832,896 | 9/1974 | Lonnroth | 73/862.33 |

FOREIGN PATENT DOCUMENTS

| 288360 | 12/1970 | U.S.S.R. | 73/862.33 |
| 466414 | 4/1975 | U.S.S.R. | 73/862.33 |

Primary Examiner—Charles A. Ruehl
Attorney, Agent, or Firm—Edwin E. Greigg

[57] ABSTRACT

The invention relates to a method and an apparatus for measuring the torque passed through a rotatable machine element, in which two parts connected to this machine element rotate relative to one another. This relative rotation is translated into an amplified axial movement, and the axial movement is measured as a standard for the transmitted torque.

9 Claims, 10 Drawing Sheets

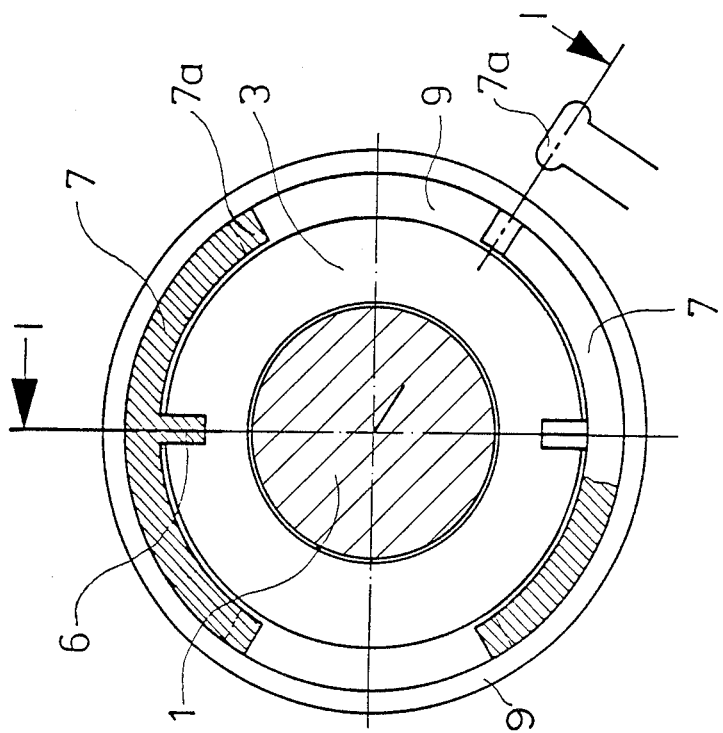
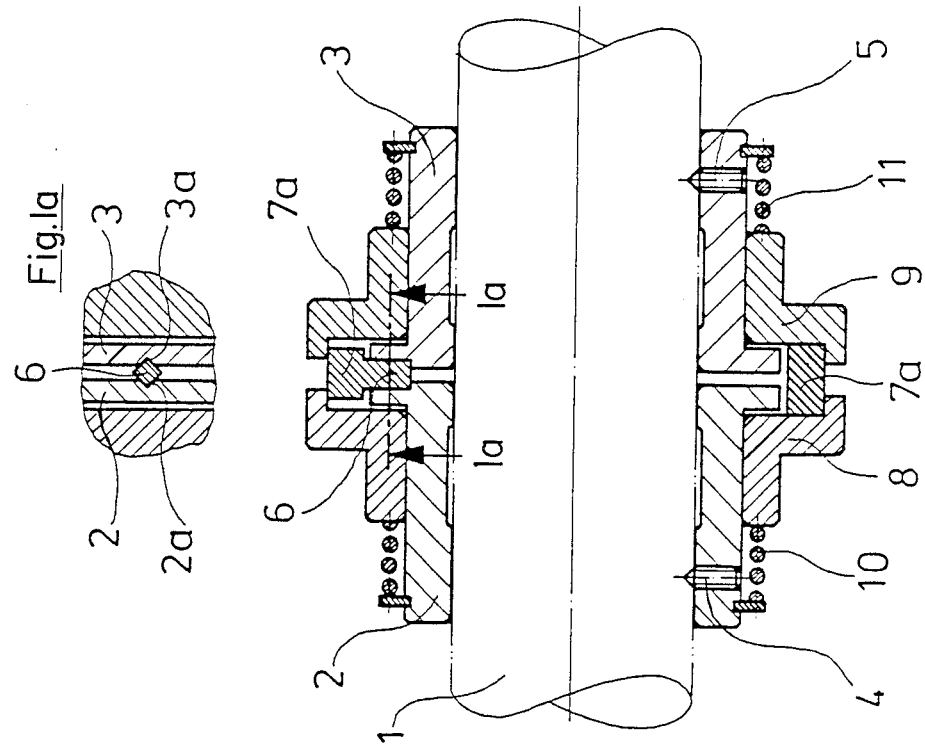

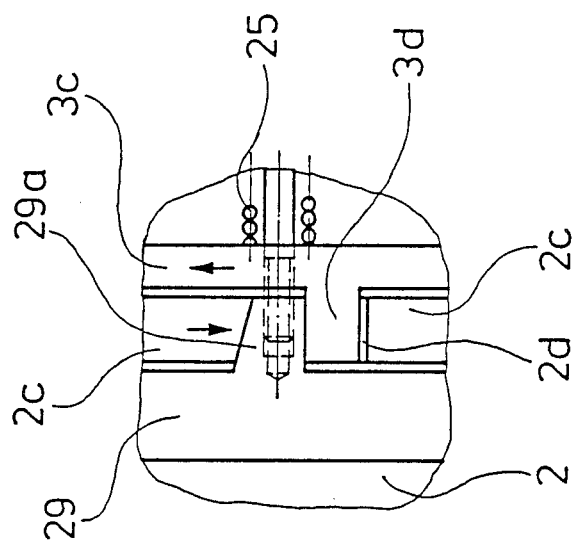
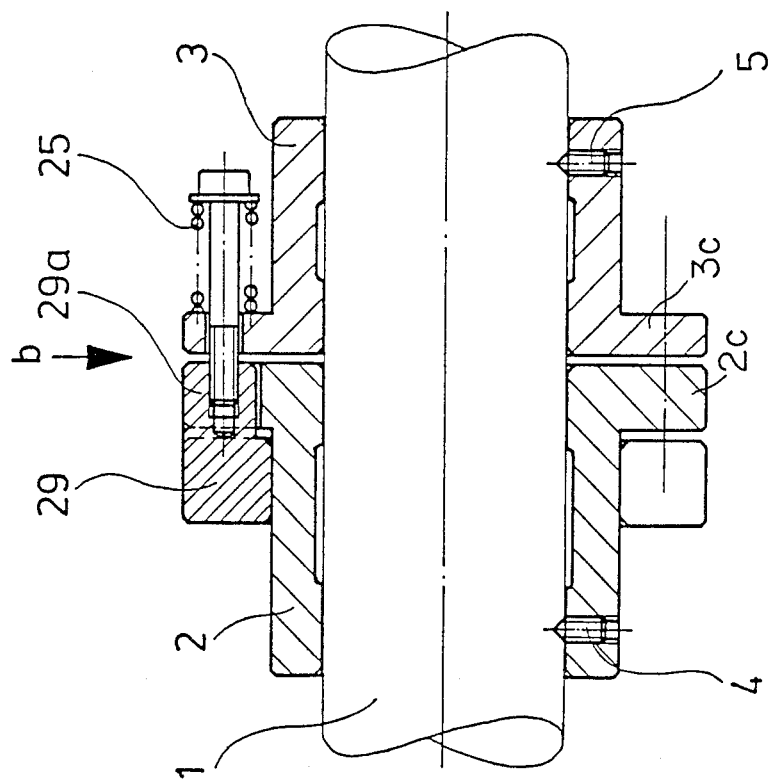
Fig. 6
Fig. 5

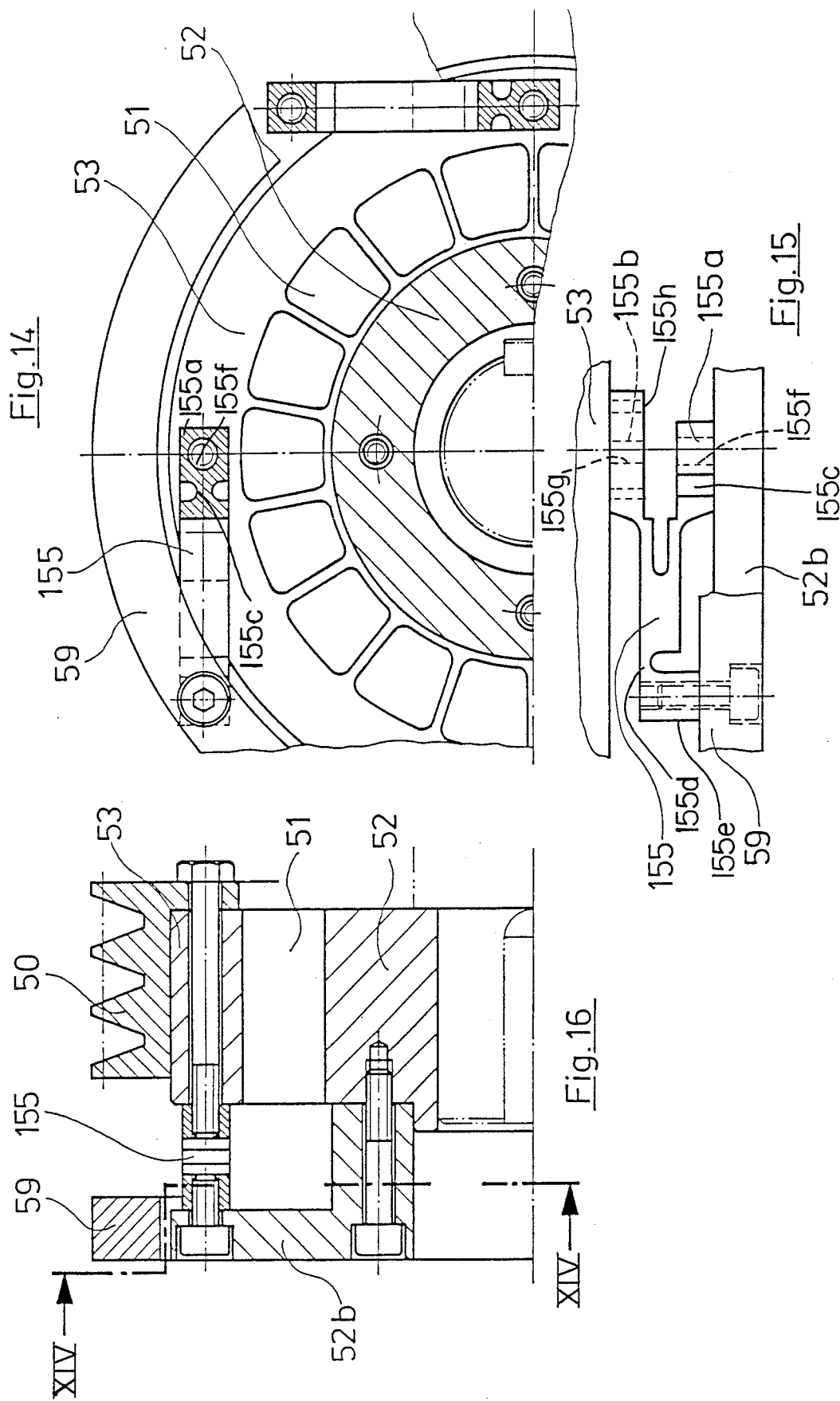

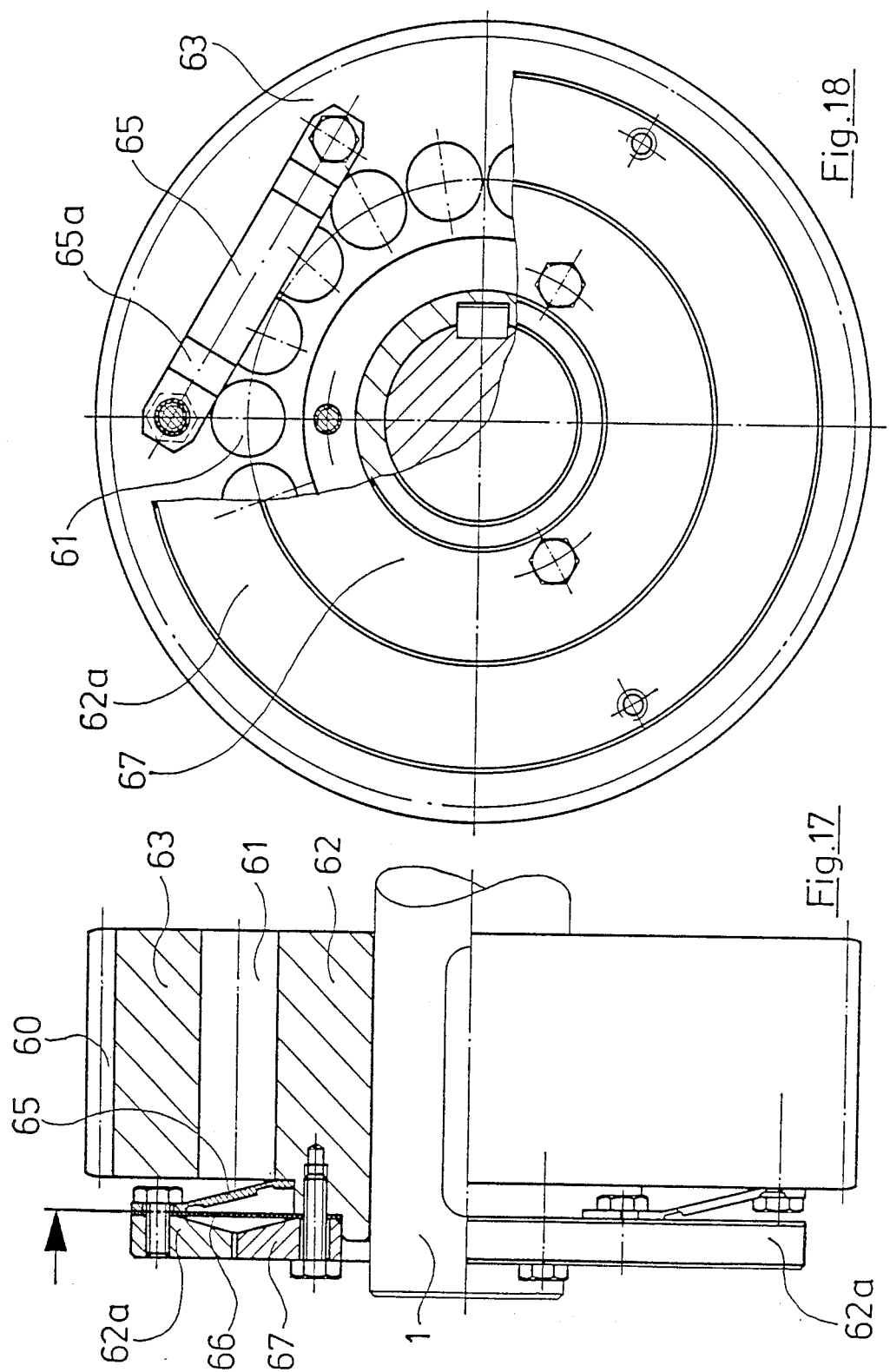

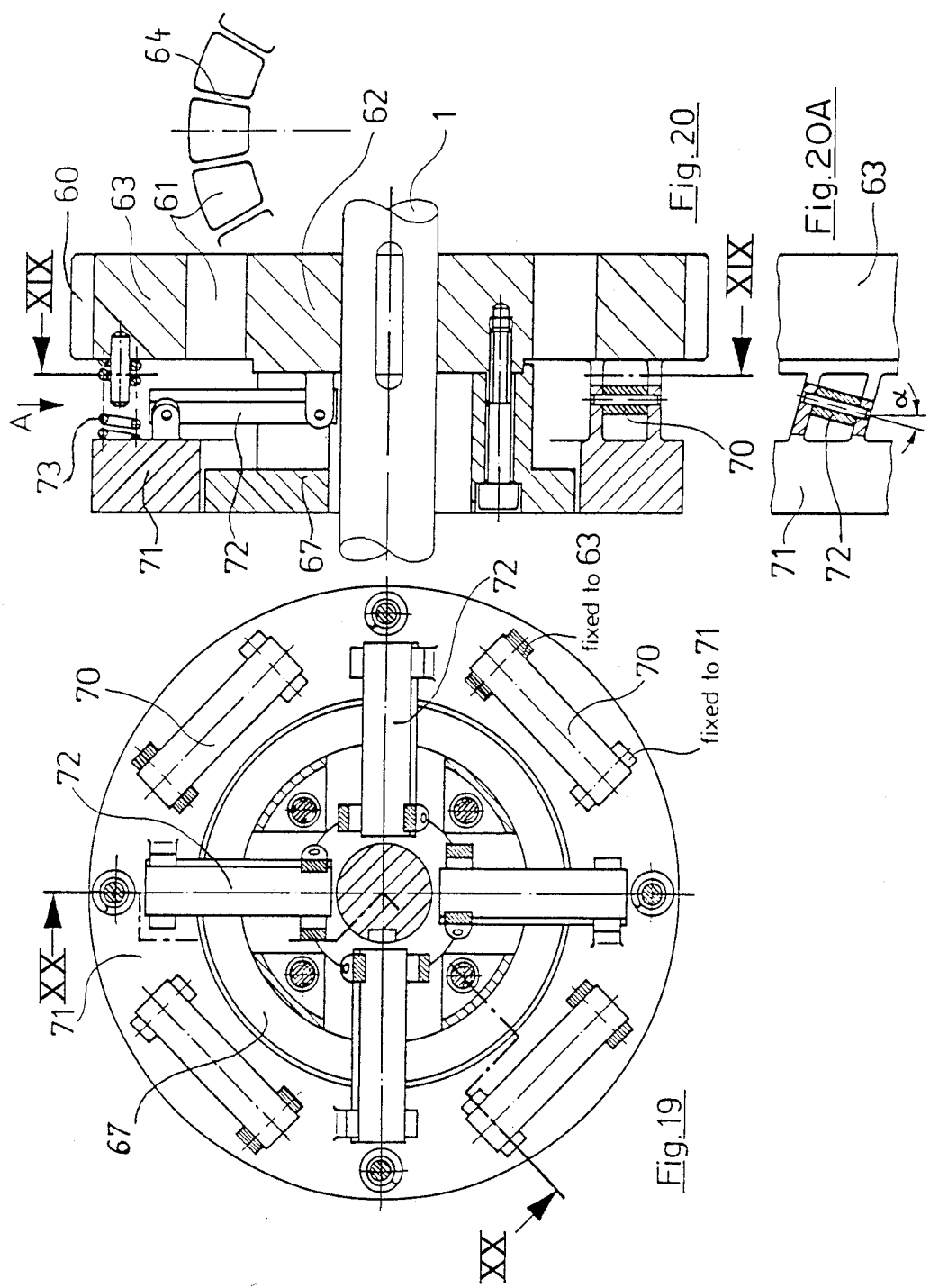

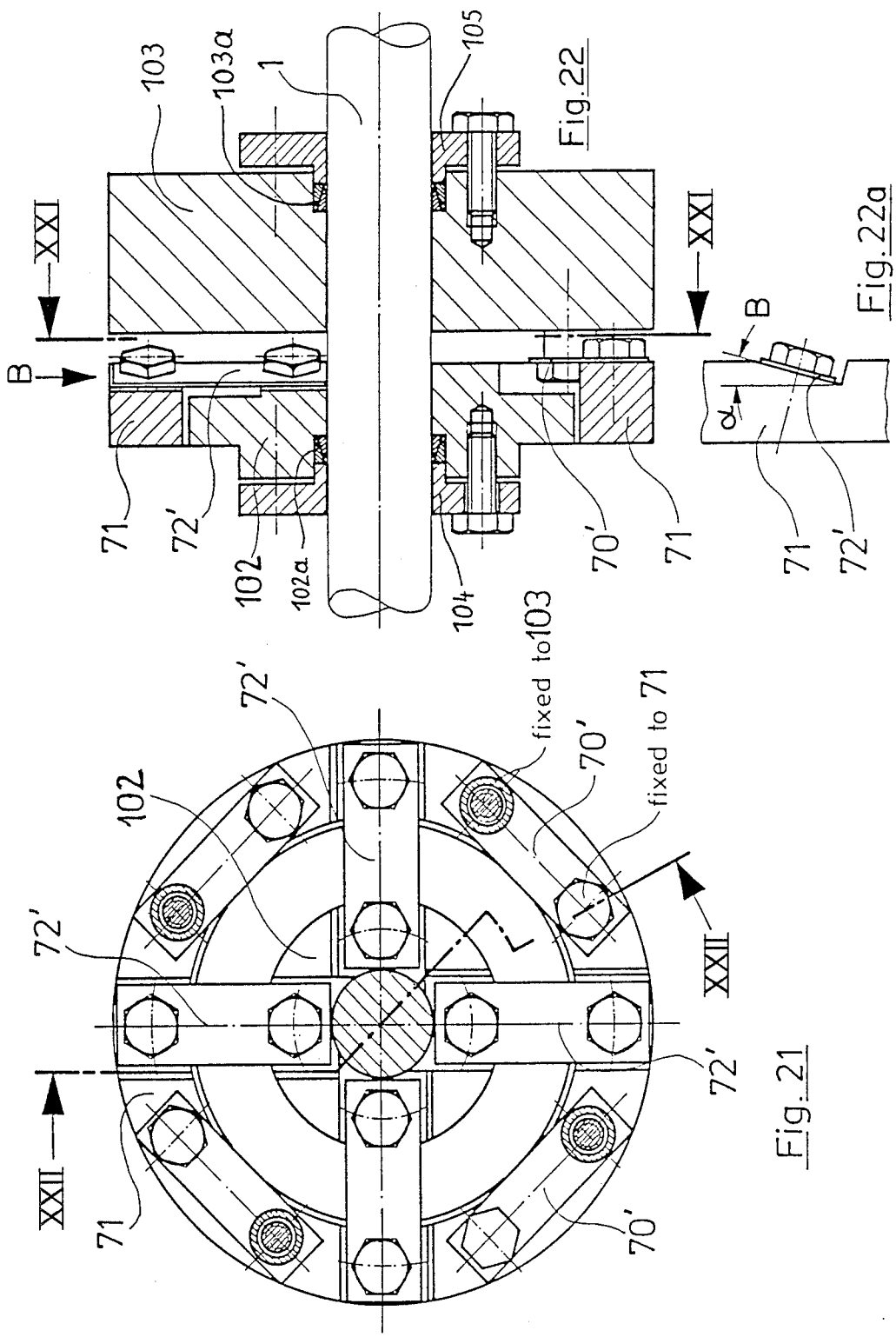

METHOD AND APPARATUS FOR MEASURING TORQUE

BACKGROUND OF THE INVENTION

The invention relates to a method and an apparatus for measuring the torque transmitted through a rotating machine element, by means of two parts connected to this machine element with axial and/or radial spacing, which rotate relative to one another. When torque is transmitted through the machine element, the relative rotation occurring in the circumferential direction between these two parts is utilized for determining the torque transmitted.

In a known measuring method of this kind, two gear wheels functioning as pulse transducers are mounted, spaced axially apart, on the machine element, for example a shaft. Their spacing is selected such that when torque is transmitted a measurable relative rotation takes place between the two wheels, because of the elasticity of the shaft. As a result, there is a temporal displacement between the pulse trains generated by the two wheels. From this displacement, the transmitted torque can be calculated.

However, with this method torque can be measured only with a rotating machine element, while contrarily it is often desirable in practice to measure the torque acting upon machine elements while they are at a standstill, for instance for starting the machine only once the measured torque is within the prescribed limits.

A further disadvantage of this known measuring system is that a structure of great axial length is required, because the two pulse transducers must be disposed far from one another in order to produce an angular difference between them that is sufficient for measuring purposes.

Another measuring principle is used with torque-measuring hubs. Here, however, the machine element that is to be tested has to be interrupted so that the measuring hub can be built into it. Also, a new bearing for the interrupted machine element must be provided on both sides of the measuring hub. Hence a great deal of installation space is still required. The apparatus cannot be retroactively installed in existing systems.

OBJECT AND SUMMARY OF THE INVENTION

With the above situation as the point of departure, an object of the invention is to improve the measuring system of the above-described generic type so that it is distinguished by requiring less installation space and by having greater measuring precision. Furthermore, it should enable measuring torque while at a standstill as well. Finally, it should be equally well suited for shafts, hubs, and the connections of these machine elements, and it should he amenable to retroactive installation in existing systems.

In terms of the method characteristics, this object is attained according to the invention in that the relative rotation between the elements used for torque measurement is converted into an amplified axial movement, and this axial movement is measured as a standard for the torque transmitted.

The relative movement in the circumferential direction when torque is transmitted is accordingly converted into an axial movement and in the course of this conversion is amplified. As a result, the following advantages are attained: An axial movement is more favorable than a movement in the circumferential or radial direction, from the standpoint of measuring instruments, because with a rotating machine element a movement in the circumferential direction is difficult to ascertain, and a movement in the radial direction is subject to the influence of centrifugal force. At the same time as the conversion, a mechanical amplification of the movement can take place, so that initial deformation of a much more limited extent is adequate. As a result, the parts used for determining the relative rotation for torque measurement can be positioned substantially closer to one another than in the previously known measuring system, and at the same time a substantially larger measuring signal is obtained, or in other words greater measurement precision. It is thus possible to work with such low initial values for the relative rotation that the system according to the invention is suitable for short shaft ends and parts of hubs as well, and is even suitable for machine elements in which the parts that rotate relative to one another are radially adjacent one another, rather than axially adjacent.

The amplification has the further advantage that in measuring the axial movement, the measurement error resulting from intrinsic bearing play, elastic deformation and thermal expansion is reduced; in fact, the greater the amplification factor, the greater the error reduction.

Various constructions are proposed for performing the method according to the invention.

According to a first proposal, the conversion of the relative rotation into an amplified axial movement is effected by means of at least one rotary body disposed between the parts that rotate relative to one another, this body being operatively connected with them and itself rotating when they undergo relative rotation; for conversion of the measured value, this rotary body has a pointer extending in the circumferential direction, and its axial deflection is measurable at the end of the pointer. That is, the relative rotation in the circumferential direction is used to generate a pointer deflection in the axial direction, and the pointer deflection is a multiple of the original adjusting travel in the circumferential direction, as a function of the pointer length.

For the embodiment of the rotary body and for effecting its operative connection with the rotating parts of the machine element, various realizations are possible. For example, it can be embodied as a knife body, which is disposed in opposing notches of the parts rotating relative to one another. Alternatively, the rotary body may also be connected via elastic joints with the two parts that rotate relative to one another. In that case it is recommended that it be embodied as a planar or angled plate of spring steel or similar material. The pointer can be connected to the rotary body either as a separate body or as an integral part of the rotary body.

A second possible realization of the conversion of the relative rotation into an amplified axial movement is attained by disposing a plurality of wedges between the parts that are rotating relative to one another, the angle of inclination of the wedges with respect to the axial direction being greater than the angle of static friction, and the wedges being operatively connected to corresponding wedge faces of one or the other part and upon torque transmission being axially displaceable relative to these wedge faces, counter to a restoring force, the axial position of the wedges being measurable.

In this construction, accordingly, the conversion and translation of movement is effected by means of inclined wedge faces. To attain a high measured value translation, the angle of inclination relative to the axial direction is selected to be as low as possible. To this end, it is recommended that linings of materials that lower the coefficient of friction be provided between corresponding wedge faces.

To assure that the wedges remain operatively connected with the parts that rotate relative to one another, they may be braced axially against these parts by means of springs.

A third option for converting the relative rotation into an amplified axial movement uses toggle levers, each being joined with one end to one or the other of the parts rotating relative to one another and at the other end to a common control member, the axial position of which is measurable; the toggle levers extend at an acute angle to the circumferential direction, and there is an angular difference between the toggle levers connected to one rotating part and the toggle levers connected to the other rotating part.

In this case, the conversion and translation of the movement is effected by a plurality of levers, which because they are arranged at an acute angle to the circumferential direction generate large axial movements from small circumferential movements.

Suitably, the toggle levers connected to one rotatable part are mirror-symmetrical to the toggle levers connected to the other rotatable part, so that the proportionality factor between the torque and the control member deflection will be independent of the torque direction.

The toggle levers may be produced such that they are integral with the two rotating parts and with the common control member, for example by milling suitably inclined slits in a thin-walled cylinder.

It is equally suitable, however, to use separate toggle levers, and the toggle levers may themselves be elastic or rigid. In the latter case, they must be elastically joined to the parts that are rotatable relative to one another.

The toggle levers may for example take the form of a fork joined to the control member, one tine of the fork being connected to one rotatable part and the other tine, which is off-set relative to the first tine, being joined to the other rotatable part. The tines preferably comprise small plates that are resistant to pressure and are joined to the two rotatable parts via elastic joints.

In a fourth, similar option, the translation of the relative rotation into an amplified axial movement is again effected by toggle levers extending at an acute angle to the circumferential direction, but that are joined at only one end to one of the two parts rotating relative to one another, while with their other end, contrarily, they are connected to a control member, which in turn is connected to the other of the two rotating parts such that the control member is fixed against relative rotation but is axially displaceable, and its axial position is measurable. Connection of the other of the two rotating parts with the toggle lever in a manner fixed against relative rotation but axially movable is effected in a simple fashion by means of a diaphragm.

For all these above-mentioned structural types, it is recommended that the indicators or wedges used to measure the axial position of control members be secured to a common transducer ring. This assures that the axial position of this transducer ring can be measured from outside, in a non-contacing manner, in any arbitrary position of the machine element.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 is an axial section taken through a torque measuring apparatus having a knife body;

FIG. 1a is a partial sectional view along 1a—1a of FIG. 1;

FIG. 2 is a cross section taken through the measuring apparatus of FIG. 1 along lines 1—1;

FIG. 5 is an axial section taken through a measuring apparatus having wedges;

FIG. 6 is a partial sectional taken through the measuring apparatus of FIG. 5;

FIGS. 14–16 are partial views of a different measuring apparatus corresponding to FIGS. 11-13;

FIG. 17 is an axial plan view of another measuring apparatus having toggle levers;

FIG. 18 is a fragmentary axial section through the measuring apparatus of FIG. 14;

FIG. 19 is an axial plan view of another measuring apparatus having obliquely arranged bending levers;

FIG. 20 is an axial section taken through the measuring apparatus of FIG. 19 along line XIX—XIX;

FIG. 20A is a partial top view of FIG. 20 in the direction of arrow A;

FIG. 21 is a plan view taken along line XXI—XXI of FIG. 20, with pivotably connected bending levers;

FIG. 22 is an axial section taken through the measuring apparatus of FIG. 21 along lines XXII—XXII; and FIG. 22a is a partial top view of FIG. 22 in the direction of arrow B.

DESCRIPTION OF THE PREFERRED EMBODIMENTS

Figures 3, 4, 4A:
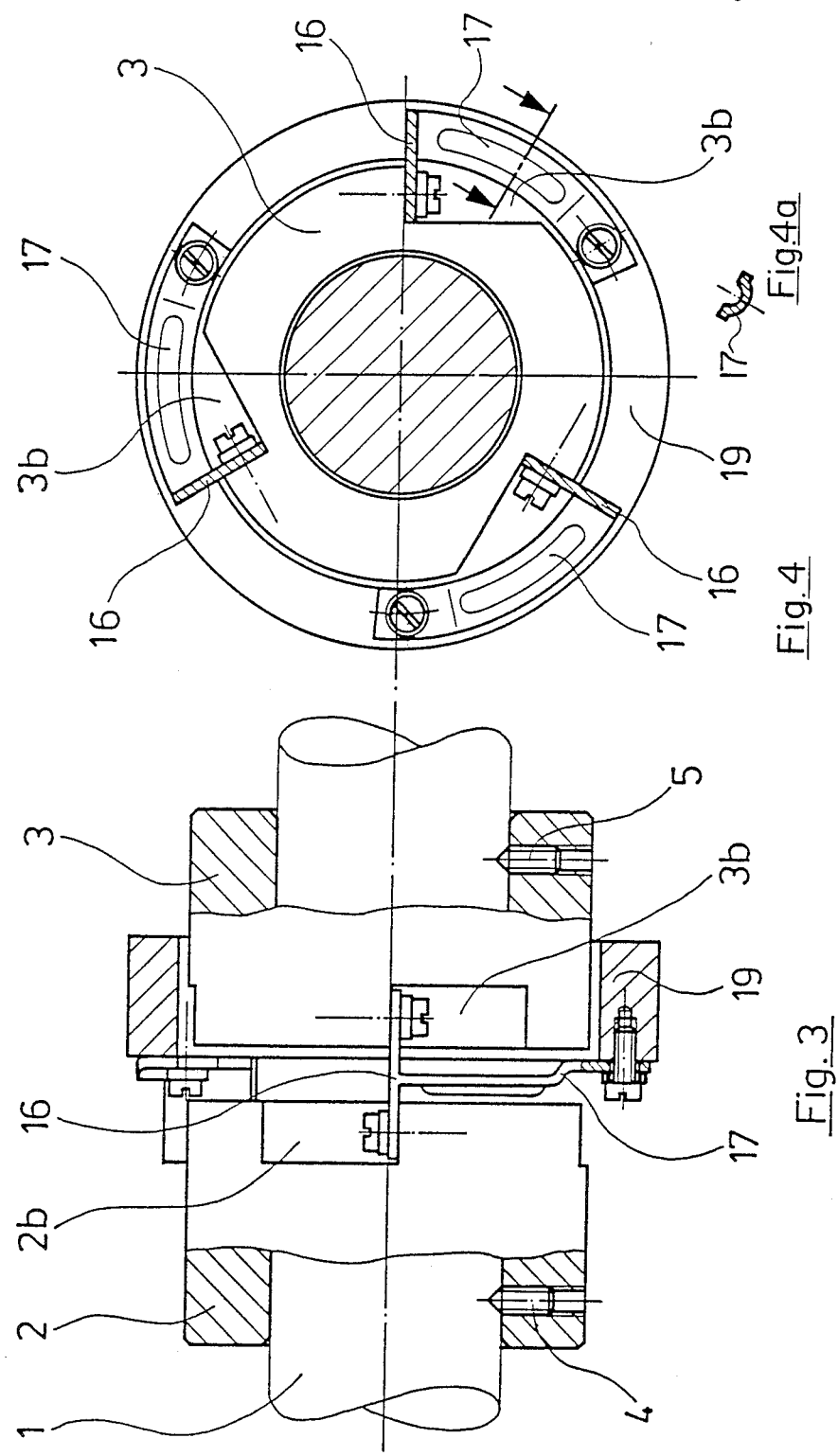
FIG. 3 is an axial section taken through a similar measuring apparatus in which the knife body has been replaced with a plate.
FIG. 4 is a cross section taken through the measuring apparatus of FIG. 3.
FIG. 4a is a partial cross sectional view along 4—4 of the pointer shown in FIG. 4.

In FIGS. 1–10, the machine element of which the torque passed through it is to be measured is a shaft 1. In contrast to known torque measuring hubs, it is not interrupted in the vicinity of the measuring apparatus, but instead passes through the measuring apparatus.

The parts connected to the machine element and that rotate relative to one another in the passage of torque are two axially adjacent rings 2 and 3, which are secured to the shaft 1 such that they are fixed against relative rotation and are not axially displaceable. This securing is suitably effected near the remote ends of the rings, for instance by means of the crossbolts 4 and 5 shown set in shallow holes drilled in the shaft, so that the axial structural length of the two rings can be exploited to the maximum possible extent for generating the maximum possible relative rotation between the rings whenever torque is passed through the shaft 1.

On their axial face ends facing one another, the rings have a plurality of notches 2a and 3a axially facing one another and equal distributed along the circumference. Supported between these opposed notches is a radially extending knife body 6, as shown in the detail drawing in FIG. 1a. The relative rotation between the rings 2 and 3 that is triggered by the transmission of torque through the shaft 1 thus leads to the rotation of the knife body 6 about an axis extending radially with respect to the shaft 1. From this rotation, a markedly amplified axial movement is derived, because each knife body is provided with a pointer 7 radially outside the notches 2a and 3a which moves in the circumferential direction. This pointer 7 is particularly visible in FIG. 2.

The pointer 7 suitably moves, beginning at the knife body 6, in not one but both circumferential directions, in each case with the same pointer length. Then, to the pointer deflection at one end is added a pointer deflection of equal magnitude at the other end, and the measurement signal, which because of the pointer length is inherently already amplified considerably, is doubled once more.

The pointer ends are embodied in crowned fashion by cylinders 7a extending radially with respect to the shaft 1 and with these ends rest without play between two oppositely disposed transducer rings 8 and 9 axially adjoining these ends 7a on both sides. The transducer rings are supported on the rings 2 and 3 in an axially displaceable manner and are kept in contact with the cylinders 7a of the pointers 7 by compression springs 10 and 11 respectively engaging the transducer rings on the outside.

In this way, the passage of torque through the shaft 1 causes the two transducer rings 8 and 9 to move axially apart, and the length of travel of the transducer rings is directly proportional to the torque.

The axial position of the transducer rings 8 and 9 is sensed in a manner known per se, in particular in a non-contacting manner, for example by means of a stationary induction ring disposed on the outside. From the voltage generated in this ring, the torque that is to be determined is finally calculated in a known manner, for example with an electronic calculator unit, not shown.

To prevent measurement error caused by thermal expansion of the shaft 1, it is in principle recommended that the axial position of the transducer rings not be measured absolutely, but rather in relation to reference surfaces that undergo equal thermal expansion. Such reference surfaces are, in particular, the radially extending end faces of the parts 2 and 3 rotating relative to one another.

As can readily be appreciated, the torque of the shaft 1, which is in the $\mu$ range, or the 1/100 mm range, generates a many times amplified axial displacement of the transducer rings 8 and 9. The fastening points of the parts 2 and 3 on the shaft can accordingly be placed axially much closer together than was previously possible, and a substantially stronger measurement signal is also obtained, which enables more accurate measurement of even a slight torque.

FIGS. 3 and 4 show a structure that is similar in principle to that of FIG. 1. Elements corresponding in function to one another are therefore identified by the same reference numerals. Instead of the knife body 6, however, equally spaced small elastic plates 16 are mounted on the rings 2 and 3. The plates 16 are each secured with one end on the ring 2 and with the other on the ring 3, spanning the space between the two rings. Suitably, the plates 16 are installed such that they extend precisely axially whenever the shaft 1 is free of torque.

Approximately at the middle of the plates, axially offstanding pointers 17 are provided, extending approximately in the circumferential direction. In contrast to the foregoing exemplary embodiment, the pointers 17 extend in only one circumferential direction and hence cooperates with only one transducer ring 19. This transducer ring needs no guidance on the parts 2 or 3. It can be retained solely by its fastening on the ends of the pointers 17.

Naturally the plate 16 is shown flat with the pointers 17 extending therefrom. The plates could be bent at an angle which would serve as the pointers. It can equally well be bent at an angle. The essential feature is only that it be sufficiently elastic to be capable of following along with the relative rotations between the rings 2 and 3. In particular, the plate 16 may be partly rigid, and may have a flexible intervening section only at each transition to the points where it is fastened to the rings 2 and 3.

Similarly, there are numerous possible variants for how the plate 16 are connected to the two rings 2 and 3. However, a screw connection in the radial direction has proved to be more favorable than an axial screw connection, because then the screw connection is subjected to less strain. To this end, the facing end faces of the rings 2 and 3 have milled slots 2b and 3b, which respectively receive the axially and radially extending bearing surfaces for the plates 16.

It may also be suitable to use a lever instead of the plates 16, the ends of the lever being pivotably affixed to the rings 2 and 3 such that upon relative rotation between the rings these ends pivot about radial axes. In that case, the lever should be embodied as rigid through its entire length.

FIGS. 5 and 6 show a measuring apparatus in which the rings 2 and 3 are operatively connected via axially aligned wedge faces.

To this end, the ring 2 has a radially protruding collar 2c, in which a plurality of recesses 2d, distributed about the circumference, are provided. Protruding into these recesses 2d are axial protrusions 3d of a corresponding collar 3c of the ring 3, on the one hand, and on the other hand axially protruding wedges 29a of a transducer ring 29.

The wedges 29a are operatively connected with the radial collar 2c via wedge faces that extend at a flat angle of incidence, or pitch, relative to the shaft axis. As a result, a relative rotation between the rings 2 and 3 in the direction of the arrows shown in FIG. 6 causes an axial thrusting out of the transducer ring 29, which is guided on the part 3 such that it is fixed against relative rotation but is axially resilient, until the increasing restoring force of the spring 25 is in equilibrium with the axial displacement force resulting from the torque.

If the measuring apparatus is to be operative in both directions of rotation, then the contacting face located opposite the oblique wedge face, between the part 29a and the protrusion 3d, need merely be inclined in mirror-symmetrical fashion.

In either case, it is recommended that a liner of friction-reducing material, not shown in the drawing, be provided between the sliding surfaces. A flat pitch at the sliding surfaces can then be used, producing a major amplification in the conversion of the circumferential movement to the axial displacement of the transducer ring 29.

Figure 7:
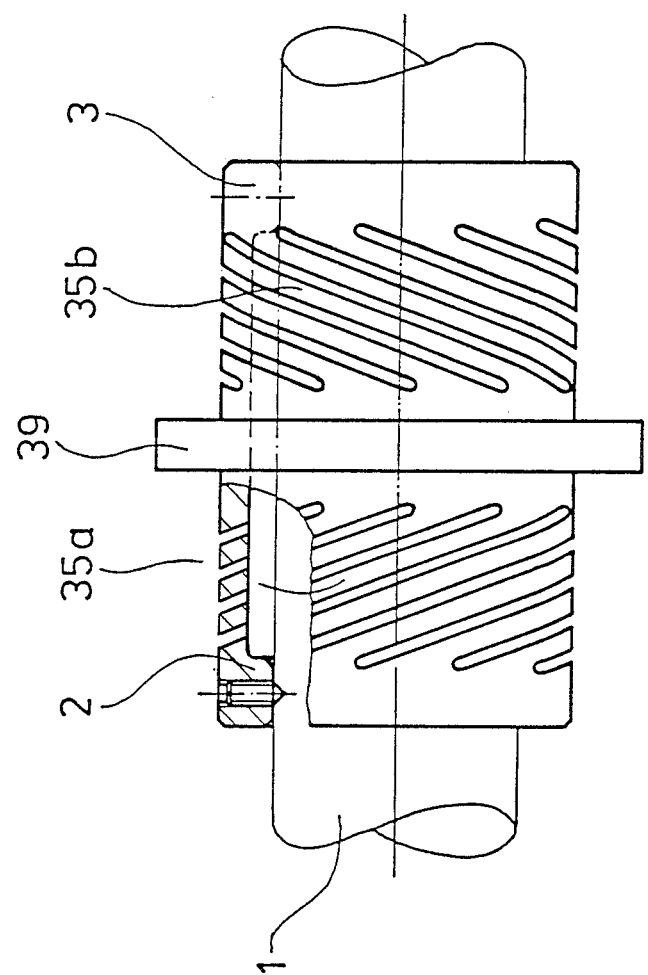
FIG. 7 is a side view, partially in section, of a measuring apparatus having integrally formed toggle levers.

FIG. 7 shows a kind of structure in which the two rings 2 and 3 are integrally connected to a common transducer ring 39 by means of a number of toggle levers 35a and 35b. The rings 2 and 3, the toggle levers 35a and 35b and the transducer ring 39 form a cylinder, into which a number of adjacently located toggle levers is produced by means of numerous helical milled slits. The toggle levers 35a and 35b extend in mirror-symmetry with one another and at the flattest possible pitch with respect to the circumferential direction, so that relative rotations between the rings 2 and 3 effect a major axial displacement of the transducer ring 39.

Figure 8:
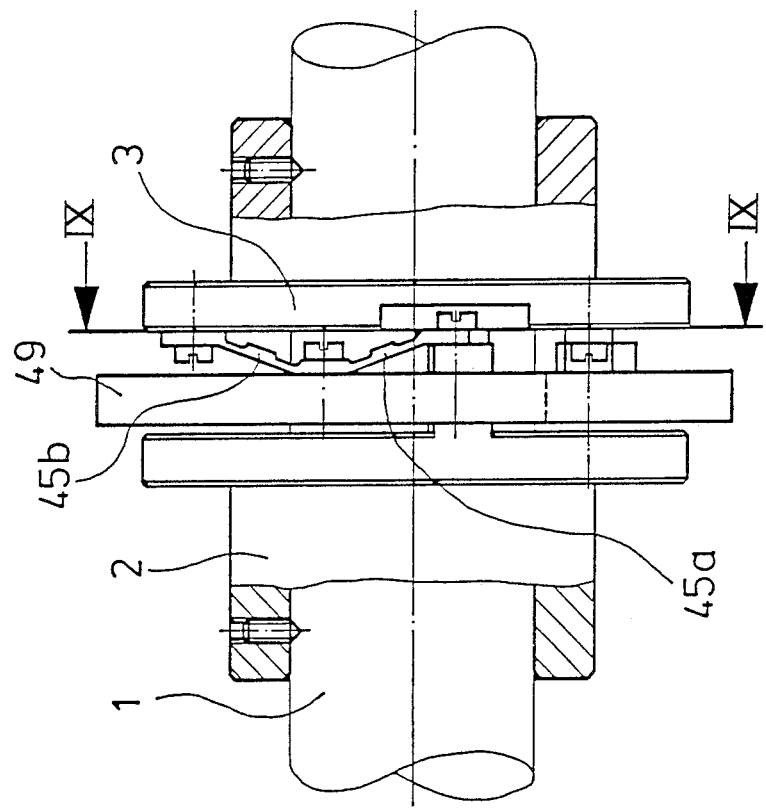
FIG. 8 is a side view of another measuring apparatus having toggle levers.
Figure 9:
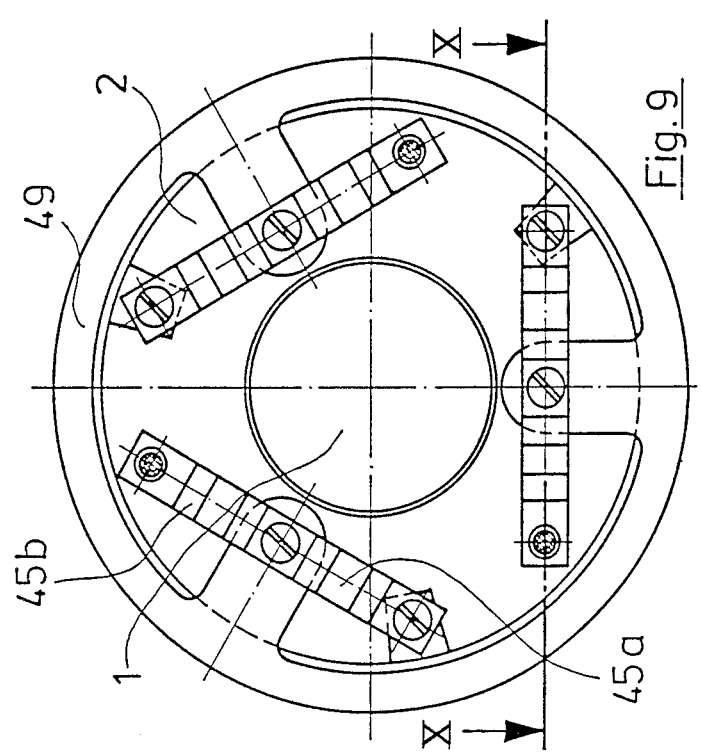
FIG. 9 is a plan view along line IX—IX in the axial direction on a portion of the measuring apparatus shown in FIG. 8.
Figure 10:
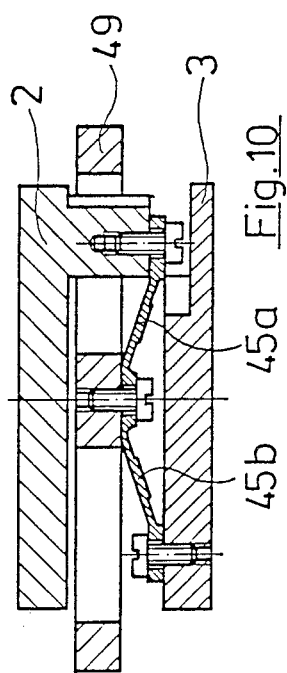
FIG. 10 is a section taken along the line X—X of FIG. 9.

FIGS. 8–10 show a construction that is similar in terms of its basic structure. However, the toggle levers here are in the form of separate components. They comprise spring bars 45a and 45b and are suitably embodied in one piece. While the spring bar 45a is connected on one end to the ring 2 and on its other end to the transducer ring 49, the other spring bar 45b is connected on one end to the ring 8 and on its other end is also connected to the transducer ring. Since the two spring bars are preferably combined into a single element, they can be joined in common to the transducer ring 49 in the middle of this single element.

The spring bars are each mounted on radially extending end faces of the rings 2 and 3 and of the transducer ring 49; one ring, in the exemplary embodiment the ring 2, has axial protrusions, which are dimensioned such that the ends of the spring bars that are connected to the rings 2 and 3 are located in a common plane, at right angles to the shaft axis. Beginning at this plane, the spring bars extend at a flat pitch to the transducer ring 49, so that the transducer ring executes the maximum possible axial displacement with respect to the torque passed through the shaft 1.

Because of the inherent elasticity of the spring bars, they need not be pivotably connected at their ends to the various connecting parts but can instead be rigidly screwed. It must merely be assured, by suitable cross-sectional dimensioning, that they will not bend arbitrarily and irregularly, but instead will execute precise pivoting movements. This can be brought about by providing that they have a defined bending range near their attachment ends, while the middle piece is kept rigid by suitable profiling.

Here again, it is understood to be within the scope of the invention for the spring bars not to be disposed on opposed end faces of the rings 2 and 3, but instead for the ends of the spring bars to be bent and mounted approximately as shown in FIG. 4.

Nor do the spring bars have to extend rectilinearly in plan view; they may be bent instead, in particular to assure that the fastening points on the transducer ring 49 (see FIG. 9) will be located farther outward.

In contrast to the foregoing drawings, FIGS. 11–15 show a measuring apparatus according to the invention on a hub-like machine element, and the parts that rotate relative to one another are arranged not axially but radially adjacent one another.

Figure 11:
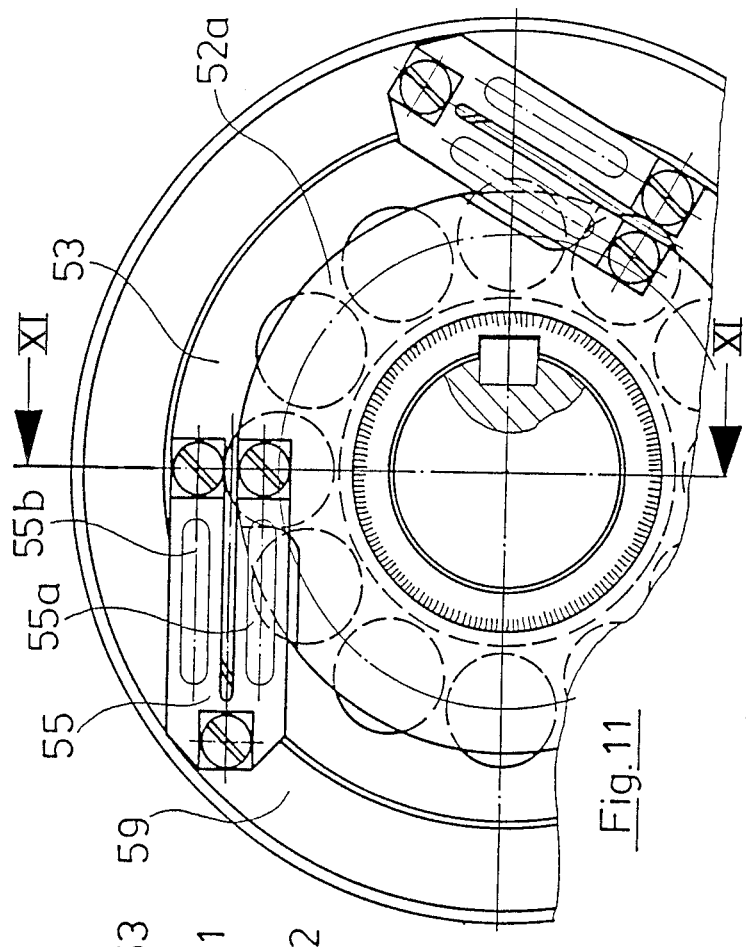
FIG. 11 is a partial plan view in the axial direction on a torque measuring apparatus having forked toggle levers.
Figure 12:
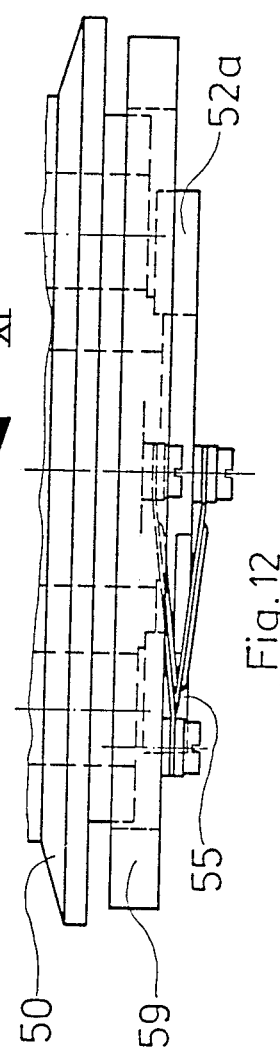
FIG. 12 is a radial plan view of the measuring apparatus of FIG. 11.
Figure 13:
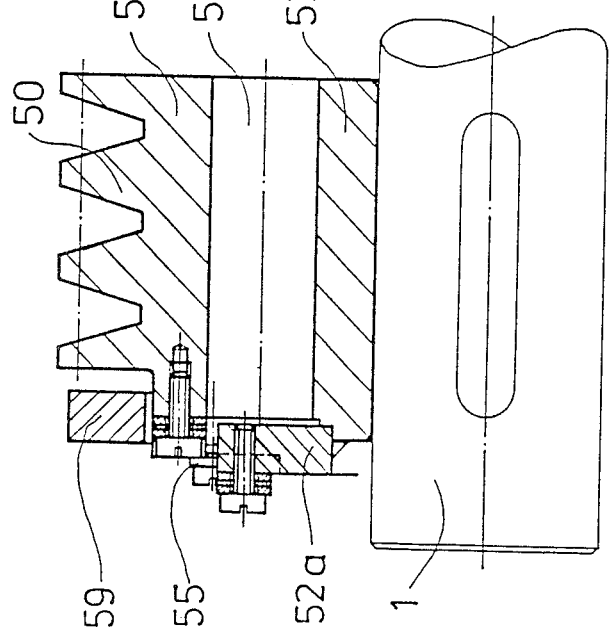
FIG. 13 is a partial axial section taken through the upper part of the measuring apparatus of FIG. 11.

In FIGS. 11–13, the machine element on which the measuring apparatus is installed is a pulley wheel 50 mounted on a shaft 1. In its middle area, it has numerous equally spaced axial bores 51 in circumferential succession. Because of this cross-sectional weakening, the torque transmission causes an elastic shift in the circumferential direction between the portions of the pulley circumference located radially inside and those located radially outside the bores 51. This relative rotation is utilized for determining the torque passed through. The above-mentioned parts rotating relative to one another when torque is transmitted are accordingly embodied here by the inner circumferential portion 52 and the outer circumferential portion 53 of the pulley.

Mounted on these circumferential portions, toward the face end and in the case of the inner circumferential portion 52 with an interposed ring 52a, are a plurality of forked toggle levers 55 distributed circumferentially. In plan view, the toggle levers extend in the tangential direction, as in the foregoing exemplary embodiment. The end of the toggle lever at which the tines 55a and 55b of the fork merge is affixed to a transducer ring 49, while the end of one fork tine 55a is fixed on the ring 52a joined to the inner circumferential portion 52 and the end of the other tine 55b is fixed to the outer circumferential portion 53.

An essential feature here is that the tines, in the installed state, must be off-set at an angle relative to one another. This off-set angle is visible in FIG. 12. The points where the tines are fastened to the parts 52a and 53 must therefore be somewhat offset from one another in the axial direction, but should be located in a common radial plane for reasons of symmetry. The other fastening point on the transducer ring 59, for reasons of symmetry, is located in a middle plane between the two radial planes mentioned above. As a result, the proportionality factor between the torque and the axial displacement of the transducer ring 59 is independent of the direction of the torque.

The tines 55a and 55b of the forked toggle lever extend mirror-symmetrically at a very flat positioning angle relative to the circumferential direction, so that relative rotation between the parts 52a and 53 effect the maximum possible axial displacement of the transducer ring 59.

The toggle levers in the exemplary embodiment are produced from spring steel and are reinforced in their middle region by profiling. As in the foregoing embodiment, uncontrolled bending is consequently avoided. Instead, defined bending regions between the profiling and the fastening points of the toggle lever are created, in which the tines of the toggle lever can bend elastically.

Naturally, it is instead possible to use toggle levers that are rigid throughout, if they are pivotably connected at the ends to the parts 52a and 53.

FIGS. 14–16 show a similar structure to that of FIGS. 11–13. In contrast to the above-described structure, a relatively solid toggle lever 155 is used here. It can be produced by milling of a solid material and is thus substantially more rigid than the above-described toggle lever 55. As a result, a higher resonant frequency of the elastic system comprising the toggle lever and the transducer ring is obtained. This substantially lowers the danger of a loss of indicating precision on the part of the transducer ring caused by vibration.

As shown particularly in FIG. 15, the forked toggle lever 155 comprises two parallel extending tines 155a and 155b, in which tine 155b is longer than tine 155a. The tines extend from a main body which is joined to the end 155e by a thin elastic joint 155d. The tine 155a is provided with a reduced area 155c and an aperture 155f by which it is secured to the part 52b. The tine 155b is provided with an aperture 155g by which it is secured to the part 53, and the end is provided with an aperture 155h by which it is secured to the transducer ring 59. The tines 155a and 155b are joined to the two parts 52 and 53 that rotate relative to one another. Since here, in contrast to the previously described structural form, the pivotable connection points of the two fork tines are in axial alignment with one another, the interior of the two parts 52 and 53 rotating relative to one another is extended outward via an angle ring 526 approximately as far as the radius of the outer part 53. Thus the toggle lever 155 can be mounted with its tines on facing flat sides 52b and 53. The other end, that is, the head element, is mounted on the transducer ring 59 as in the above-described structure, and depending on the rotational angle and rotational direction arising between the parts 52 and 53, the head element displaces the transducer ring 59 to a variably great extent in one or the other axial direction.

Since the described rotation between the parts 52 and 53 also causes a bending of the pivotable connection points of the tines 155a and 155b, one of the two tines can suitably be secured to the part 52b or 53 via a joint that is yielding in the radial direction.

For the sake of vibration damping, it may also be suitable to combine the toggle levers with damping material, or to fill the interstice between the control member 59 and its adjoining ring (in this case the angle ring 52b) with elastic or plastic compositions. This is equally true for the other variant embodiments of the invention.

In FIGS. 17 and 18, the measuring apparatus is mounted on a gear wheel 60. Once again, the elasticity of the gear wheel in the circumferential direction is so greatly increased, by numerous axial bores 61 succeeding one another in the circumferential direction, that upon torque transmission a certain relative rotation occurs between the inner circumferential portion 62 and the outer circumferential portion 63. That is, these circumferential portions once again function like the parts mentioned earlier that rotate relative to one another and from which the measurement of the torque is derived.

To translate the relative movement into an amplified axial movement, a plurality of toggle levers 65 are used, which again are symmetrically distributed over the circumference, but which in contrast to the two exemplary embodiments described above are not two-armed but are single-armed.

As the drawing shows, one end (on the right in FIG. 17) of the toggle lever is fixed to the outer circumferential portion 63, and the other end of the toggle lever is affixed to a ring 62a joined to the inner circumferential portion 62. The fixation is effected in each case at the end faces of the circumferential portion 63 or of the ring 62a, these end faces being somewhat offset in the axial direction, so that the toggle lever 65 extends at the desired flat pitch relative to the circumferential direction.

An essential feature is that the ring 62a is connected such that is is fixed merely against rotation but is axially displaceably connected to the inner circumferential portion 62. This is accomplished by means of a radially extending diaphragm disk 66, which is secured on the inside on the circumferential portion 62 and on the outside on the ring 62a. In this manner, the ring 62a is displaced in one or the other axial direction depending on the direction of torque and so itself acts as the transducer ring.

The toggle lever shown in FIG. 17 comprises a spring steel band 65a, which is reinforced in the middle area and at the two attachment ends. As a result, the elastic bending of the toggle lever is restricted to the precisely defined, unreinforced intermediate portions.

FIG. 18 also shows the usage of a reference ring 67. It is fixed to the inner circumferential portion 62 and is flush with the ring 62a, whenever no torque is being transmitted. The usage of this kind of reference ring, which may logically also be built into the exemplary embodiments described above, is recommended whenever the machine element that is to be tested is subjected to severe temperature factors and to the attendant shifts in the axial direction. These axial shifts, which necessarily affect the axial position of the transducer ring as well, would result in measurement error. This error is precluded by measuring the axial position of the transducer ring relative to the reference ring, rather than absolutely. This can be done with electronic measuring instruments known per se.

FIGS. 19 and 20 show a measuring apparatus of a structural type similar to that shown in FIGS. 17 and 18. Here again, by means of suitable shaping such as the provision of spokes 64, the hub is very rigid in the axial direction, but in the circumferential direction it is torsionally elastic, so that when subjected to torque the result is a relative rotation between the inner circumferential portion 62 and the outer circumferential portion 63.

As shown in the lower half of FIG. 20, the relative rotation of the outer circumferential portion 63 is transmitted via a plurality of tangentially extending tension straps 70 to a coaxially arranged control ring 71.

Inside the control or transducer ring 71, there is a ring 67, which is immovably connected to the inner circumferential portion 62 and can function as a reference ring. To convert the rotation of the transducer ring 71 relative to the reference ring 67 into an axial displacement of the transducer ring, these two rings are joined to one another by means of a plurality of bending levers 72. An essential feature is that these bending levers 72 are not located precisely within a radial plane, but instead are installed obliquely, at a pitch α, like the blades of a propeller. As a result, upon relative rotation between the rings 62 and 71 the latter ring is compelled by the bending levers 72 to execute an axial movement. Depending on the angle selected, a notable increase in the axial travel, as compared with the initial rotation in the circumferential direction, can effected. The axial displacement of the transducer ring 71 can be in turn be picked up via suitable, non-contacting travel measuring instruments.

The tension straps 70 and the bending levers 72 are embodied as solid tension or compression bars and are pivotably connected at their ends to the aforementioned connecting parts via joints.

The necessary bracing between the movable parts of the measuring apparatus is effected by means of compression springs 73 distributed over the circumference, which are axially braced between the hub part 60 and the transducer ring 71.

So that the apparatus will be suitable for torque in both the right and left directions, the tension straps 70 can be biased; this means that when the torque is zero, the transducer ring 71 already has a defined deflection, which this corresponds to the zero position of the system.

FIGS. 21 and 22 show a measuring apparatus in which the conversion of the relative rotation into an amplified axial displacement is effected by the same principle as in FIGS. 19 and 20. In contrast to that embodiment, however, here the two parts rotating relative to one another are not radially adjacent one another, but axially. These elements are rings 102 and 103, which are disposed axially adjacent one another on the shaft 1. Their rigid connection with the shaft is effected via a pair of conical clamping rings 102a and 103a, which are made to slide axially over one another by outer flanged rings 104 and 105 and thus bring about the radial bracing between the parts 102, 103 and the shaft 1.

Similarly to FIGS. 19 and 20, here again the relative rotation of one part, namely the part 103, is transmitted to the transducer ring 71 via numerous tension straps 70' disposed over the circumference and extending approximately at a tangent. The transducer ring 71 is in turn, as described above, connected via a plurality of radially extending bending levers 72' to the other of the two parts rotating relative to one another, that is, the part 102, such that it is fixed against relative rotation but is axially displaceable. The bending levers 72' are again installed at a pitch α in propeller-like fashion, so that when there is relative rotation between the rings 102 and 103, the result is an axial displacement of the transducer ring 71.

The transducer ring 71 and the part 102 are disposed such that their radially extending end faces are flush with one another on one side. As a result, the part 102 can be used as a reference ring for measuring the axial displacement of the transducer ring 71.

While the tension straps 70 and the bending levers 72 in FIGS. 19 and 20 are embodied as solid tension or compression bar, in this embodiment the tension straps 70' and bending levers 72' are of spring steel. Because of this, they can elastically absorb the resultant deformations in the axial displacement of the transducer ring 71 and can be fixedly mounted directly at their ends to the particular attachment parts. Accordingly, the joints shown in FIGS. 19 and 20 are unnecessary here.

In summary, all the exemplary embodiments are distinguished by the fact that the measuring apparatus can be mounted without interrupting the torque train, that while having a compact structure it generates a substantially higher measurement signal than before, and that this measurement signal can be picked up in a non-contacting manner even when the machine element is at a standstill or in other words is not rotating, and even independently of the angular position of the machine element.

Single characteristics of individual exemplary embodiments can be combined with or used to replace those of other exemplary embodiments without departing from the scope of the invention.

The foregoing relates to preferred exemplary embodiments of the invention, it being understood that other variants and embodiments thereof are possible within the spirit and scope of the invention, the latter being defined by the appended claims.

What is claimed and desired to be secured by letters Patent of the United States is:

1. An apparatus for measuring the torque of a rotatable machine element, by means of first and second elements connected at an axial and/or radial distance with said machine element which rotate relative to one another when a torque is applied to the machine element, wherein a relative rotation between said first and second elements, taking place in a circumferential direction, is translated by means of a plurality of forked elastic levers connected thereto and distributed over a facial surface thereof into an amplified axial motion of a control member, and this axial motion is measured as a standard for the transmission torque, said forked elastic levers are connected at their forked end base portions with one or the other of said facial surfaces of said first and second elements which rotate relative to one another and at their joined end head portions to said control member, in which each of said forked elastic levers (155) are in the form of a fork including two tines (155a, 155b) which extend parallel to one another, each of said tines include apertures in their ends by which said ends are connected to one or the other said elements (52b, 53), one of said two tines (155a) is provided with a reduced cross section (155c) that is yielding in the radial direction and connected on an end with the part (52b) associated with said tine, and said tines (155a, 155b) are joined to one another and form a fork handle parallel with said tines, said fork handle in turn is connected via a thin elastic joint (155d) and a head portion with said control member (59).

2. An apparatus as set forth in claim 1, which includes means for measuring the axial position of said control member.

3. An apparatus as defined by claim 2, in which said fork tines (155a, 155b) are in alignment with one another in the axial direction.

4. An apparatus as defined by claim 1, in which said forked elastic levers comprise spring steel or similar materials.

5. An apparatus as defined by claim 1, in which said forked elastic levers are produced by milling slits out of a metal block.

6. An apparatus as defined by claim 1, in which said forked elastic levers are combined with damping material.

7. An apparatus as defined by claim 1, which includes interstice between said control member (39, 49, 59, 62a, 71) and one axially non-displaceable part adjoining it is filled with damping material 8. An apparatus as defined by claim 1, in which said control member corresponds with a reference ring (67) disposed axially nondisplaceably on a shaft (1), and that an axial position of said control member relative to the reference ring (67) is measurable.

9. An apparatus as defined by claim 8, in which said reference ring (67) is connected to said first element (62) or is identical to one (102) of said first and second elements.

* * * * *

UNITED STATES PATENT AND TRADEMARK OFFICE
CERTIFICATE OF CORRECTION

PATENT NO. : 4,809,557
DATED : March 7, 1989
INVENTOR(S) : Ruprecht Maurer, Karlheinz Timtner & Frank Rieg It is certified that error appears in the above-identified patent and that said Letters Patent is hereby corrected as shown below:

On the Title Page, Item [75], should read

--Ruprecht Maurer, Karlheinz Timtner, both of Bad Homburg; Frank Rieg, Darmstadt-Eberstadt, all of Fed. Rep. of Germany--

Signed and Sealed this

Second Day of January, 1990

Attest:

JEFFREY M. SAMUELS

Attesting Officer    Acting Commissioner of Patents and Trademarks